US006718374B1

(12) United States Patent
Del Sordo et al.

(10) Patent No.: US 6,718,374 B1
(45) Date of Patent: Apr. 6, 2004

(54) METHOD AND SYSTEM FOR IDENTIFYING AND DOWNLOADING APPROPRIATE SOFTWARE OR FORMWARE SPECIFIC TO A PARTICULAR MODEL OF SET-TOP BOX IN A CABLE TELEVISION SYSTEM

(75) Inventors: Christopher S. Del Sordo, Souderton, PA (US); Glen P. Goffin, II, Fountainville, PA (US); Christopher Poli, Doylestown, PA (US); Douglas S. Makofka, Willow Grove, PA (US); Lawrence Vince, Lansdale, PA (US); Ardie Bahraini, Duluth, GA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/544,461

(22) Filed: Apr. 7, 2000

Related U.S. Application Data
(60) Provisional application No. 60/130,328, filed on Apr. 21, 1999.

(51) Int. Cl.[7] .................. G06F 15/177; H04N 7/173
(52) U.S. Cl. ................ 709/220; 709/222; 725/116
(58) Field of Search ................ 709/233, 220, 709/222; 725/116, 70, 132; 370/110.1; 380/232, 210; 345/823; 705/44

(56) References Cited

U.S. PATENT DOCUMENTS

| 5,420,866 A | | 5/1995 | Wasilewski | |
|---|---|---|---|---|
| 5,440,632 A | | 8/1995 | Bacon et al. | |
| 5,666,293 A | * | 9/1997 | Metz et al. | 709/220 |
| 5,734,589 A | | 3/1998 | Kostrewski et al. | |
| 5,805,165 A | * | 9/1998 | Thorne et al. | 345/823 |
| 5,852,290 A | | 12/1998 | Chaney | |
| 5,951,639 A | * | 9/1999 | MacInnis | 725/70 |
| 5,968,129 A | * | 10/1999 | Dillon et al. | 709/233 |
| 6,018,724 A | * | 1/2000 | Arent | 705/44 |
| 6,105,134 A | * | 8/2000 | Pinder et al. | 713/170 |
| 6,246,767 B1 | * | 6/2001 | Akins et al. | 380/210 |
| 6,256,393 B1 | * | 7/2001 | Safadi et al. | 380/232 |
| 6,263,506 B1 | * | 7/2001 | Ezaki et al. | 725/116 |
| 6,286,037 B1 | * | 9/2001 | Matsuura | 709/220 |

FOREIGN PATENT DOCUMENTS

| EP | 0 905 984 A2 | 3/1999 |
|---|---|---|
| EP | 0 907 285 A1 | 4/1999 |
| WO | 97/30549 | 8/1997 |

OTHER PUBLICATIONS

Written Opinion from International Preliminary Examination Authority, dated Jan. 16, 2001.
International Preliminary Examination Report, May 2, 2001 PCT/US00/10017.

* cited by examiner

Primary Examiner—John Follansbee
Assistant Examiner—Kenny Lin
(74) Attorney, Agent, or Firm—Steven L. Nichols; Ronald P. Kananen; Rader, Fishman & Grauer PLLC

(57) ABSTRACT

A method and system identify programming code that is appropriate to the architecture and capabilities of a set-top terminal in a cable television system. The appropriate programming code is identified from among a variety of code objects being broadcast from the headend facility of the cable television system. A platform identifier stored in the set-top terminal is matched to a corresponding platform identifier in an entitlement management message or other download locator message that specifies where in the transport stream from the headend a particular code object can be acquired. By acquiring the object corresponding to the message bearing a matching platform identifier, the set-top terminal acquires programming code compatible with its attributes. Additionally, the cable television system can then optimally support a varied population of set-top terminals.

34 Claims, 4 Drawing Sheets

METHOD AND SYSTEM FOR IDENTIFYING AND DOWNLOADING APPROPRIATE SOFTWARE OR FORMWARE SPECIFIC TO A PARTICULAR MODEL OF SET-TOP BOX IN A CABLE TELEVISION SYSTEM

RELATED APPLICATIONS

This application claims priority from a previous U.S. provisional patent application entitled "Software and Firmware Initialization and Upgrade Management System and Method for an Advanced Set-Top Box in a Cable Television System," Ser. No. 60/130,328, filed Apr. 21, 1999.

FIELD OF THE INVENTION

The present invention relates to the field of initializing a set-top terminal of a cable television system and upgrading the software or firmware in the set-top terminal. More particularly, the present invention relates to the field of identifying and then downloading a specific version of a base platform code or other code object over the cable network that is appropriate to the architecture and capabilities of set-top terminal performing the download.

BACKGROUND OF THE INVENTION

In a typical cable television system, subscribers are provided with a set-top box or terminal. The set-top terminal is a box of electronic equipment that is used to connect the subscriber's television, and potentially other electronic equipment, with the cable network. The set-top box is usually connected to the cable network through a co-axial wall outlet.

The set-top box is essentially a computer that is programmed to process the signals from the cable network so as to provide the subscriber with the cable services. These services from the cable television company typically include access to a number of television channels and, perhaps, an electronic program guide. Additional premium channels may also be provided to subscribers at an additional fee. Pay-per-view events and video-on-demand may also be provided over the cable network. The set-top box is programmed to provide these and other services to the subscriber.

However, the services of the cable company need not be limited to providing television programming. Some cable companies are now offering internet access and e-mail over their cable networks at speeds much faster than are available over conventional telephone lines. It is anticipated in the future that more and more services will be provided over the cable network, including even basic telephone service. Eventually, each home or office may have a single connection, via the cable network, to all electronic data services.

When a new set-top terminal is added to the cable network, it must be initialized. To initialize a set-top terminal, the terminal must be provided with the programming required to allow it to function within the specific cable network to which it is connected and to thereby provide the services for which the subscriber has paid. Additionally, as the cable network and the services provided evolve, the set-top terminal must also evolve to be able to provide subscribers with all the services of the cable network. This set-top box evolution will primarily involve changes to the programming, or perhaps a re-initialization, of the set-top box. By upgrading the soft- or firmware of the set-top box, the box can be made to perform more efficiently or offer new services as the cable network evolves.

In order to initialize new set-top terminals and upgrade the programming in the existing population of set-top boxes on a cable network, it is preferable to transmit the necessary programming to the set-top boxes via the cable network itself. Otherwise, a technician must visit each subscriber to install or upgrade the set-top boxes. Such field installations and upgrades would obviously be at significant expense. The headend is the facility from which the cable network operator broadcasts television signals and provides other services over the cable network. Software that is provided to the population of set-top terminals could be broadcast from the headend over the cable network.

However, there are a variety of problems associated with initializing and upgrading set-top terminals by broadcasting programming from the headend. For example, over time the population of set-top terminals will likely include different makes and models of set-top terminals with different capacities. The software required to initialize or upgrade each make and model of set-top terminal may be different. Consequently, there is a need in the art for a method of matching the proper programming code to the capabilities of the set-top terminal being initialized or upgraded. Additionally, there is a need to automate the initialization process so as to eliminate or decrease the time required by a technician to install, upgrade or re-initialize a set-top terminal.

SUMMARY OF THE INVENTION

It is an object of the present invention to meet the above-described needs and others. Specifically, it is an object of the present invention to provide a method and mechanism for matching the proper programming code being broadcast over the cable plant to the capabilities of the set-top terminal being initialized or upgraded. Additionally, it is a further object of the present invention to automate the initialization process so as to eliminate or decrease the time required by a technician to install, upgrade or re-initialize a set-top terminal.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve these stated and other objects, the present invention may be embodied and described as a method of identifying a code object for download by a set-top terminal from a data transport stream broadcast to the set-top terminal over a cable television system where the object identified is appropriate to the architecture and capabilities of the set-top terminal. The method is performed by matching a platform identifier stored in the set-top terminal with a platform identifier in a download locator message that specifies where in the data transport stream a particular code object can be acquired. The platform identifier is specific to the architecture and capabilities of the set-top terminal. Preferably, the download locator message is an entitlement management message.

Prior to comparing the platform identifiers, the method includes tuning the data transport stream with the set-top terminal based on a table of control channels carrying data transport streams. After tuning the data transport stream, the method proceeds by collecting PID 1 packets from the data transport stream and extracting from the data of those packets a table specifying packet identifiers for a group of download locator messages being transmitted on the data transport stream. With this table, the method proceeds by successively acquiring each of the download locator messages listed in the table and extracting from each download locator message a platform identifier. This continues until a download locator message is found bearing a platform identifier that matches the platform identifier stored in the set-top terminal.

After a match is found, the method proceed by obtaining locator data from the download locator message that has the platform identifier that matches the platform identifier stored in the set-top terminal. The locator data specifies where in the data transport stream a particular code object can be acquired. That particular code object will be appropriate for and compatible with the set-top terminal as indicated by the matched platform identifiers. The method then concludes with downloading to the set-top terminal the particular code object specified by the locator data from the download locator message that contains the platform identifier that matches the platform identifier stored in the set-top terminal.

The particular code object being acquired can be any of several different classes of objects. For example, the object can be a base platform code object, an operating system code object or a resident application code object.

The present invention also encompasses the necessary hardware to perform the method described above. For example, the present invention encompasses a system for of identifying a code object for download by a set-top terminal from a data transport stream broadcast to the set-top terminal over a cable television system where the object identified is appropriate to the architecture and capabilities of the set-top terminal. Such a system would minimally comprise means for obtaining a first platform identifier in a download locator message that specifies where in the data transport stream a particular code object can be acquired; and means for matching the first platform identifier with a second platform identifier stored in the set-top terminal.

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION OF THE INVENTION

The present invention addresses the problems involved in broadcasting a variety of programming over a cable television system for download by the population of set-top terminals connected to the network so as to initialize or upgrade those terminals where different programming objects being broadcast are appropriate to different specific classes of set-top terminals within the terminal population and each downloading terminal must identify and acquire the programming object or objects appropriate to its architecture and capabilities. This process includes providing those code objects to the set-top boxes that are necessary to allow those set-top boxes to function within the cable system or to upgrade the programming resident in different classes of set-top boxes so as to provide the services purchased by subscribers.

Figure 3:
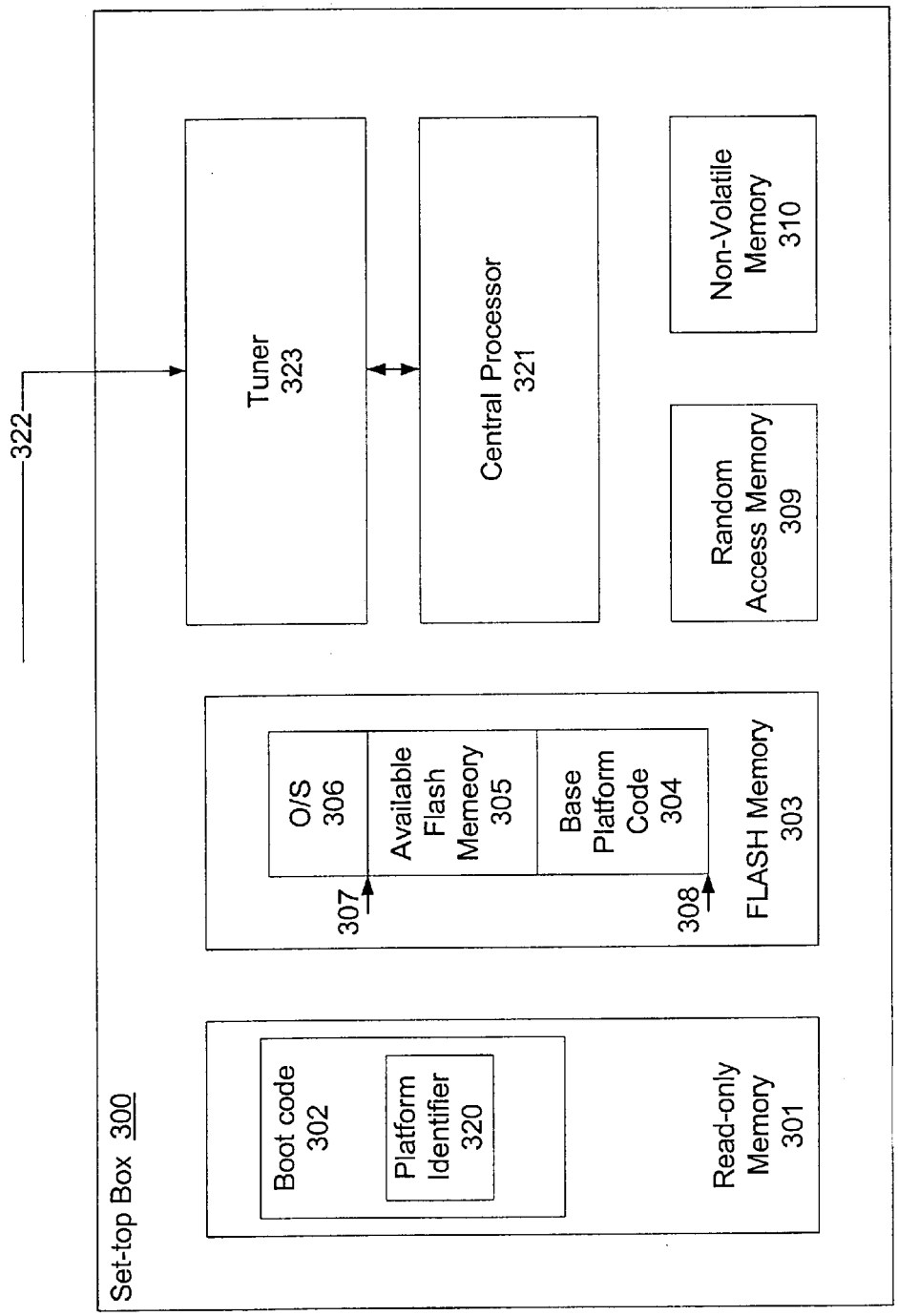
FIG. 3 is a block diagram of the various memory devices and some code objects used in a set-top box according to the present invention.

Stated in broad principle, the present invention aims to provide a set-top terminal architecture that includes a resident boot code object. As shown in FIG. 3, the boot code object (302) resides in the set-top terminal (300), preferably in read only memory (ROM) (301) and can automatically execute and initialize or reinitialize the set-top terminal. The boot code will preferably be automatically executed by the central processor (321) of the set-top terminal. Execution of the boot code may be triggered by and immediately follow connection of power to the set-top terminal. The present invention may additionally require connection of the transport stream signal (322) from the cable system before execution of the boot code is triggered. Once the boot code is executing, no further action by the user/installer need be required. Moreover, no specific interaction is required between the headend and the set-top terminal that is initializing or booting.

As will be described in detail below, the boot code (302) of the present invention will automatically find, download and begin execution of the correct software code object or objects needed to initialize the set-top terminal. The boot code (302) will locate, identify and download the required programming from among potentially many code objects that might be multiplexed on the transport stream (322) coming from the headend facility of the cable television system. The boot code (302) recognizes the hardware configuration of the set-top terminal (300) in which it resides via an internal ROM coded identifier (320). This identifier (320) is matched against a value carried in an object download locator message from the transport stream (322) to insure that the boot code (302) obtains and downloads objects appropriate to the set-top terminal (300) in which the boot code (302) is resident.

Functionally, the boot code of the present invention will identify an appropriate control channel frequency, find the stream of control data packets within that control channel, identify and download the correct object from among the objects on the transport stream, verify that the downloaded code is authorized and error-free, and start the downloaded code without direct assistance by a technician or intervention from the headend. The term "boot code" as used herein comprises the minimal code needed to accomplish this functionality.

There are essentially two distinct phases of programming a set-top box addressed by the present invention. The first is the initial programming of the set-top box. The second is upgrading the programming or re-initialization of the set-top box after that box has been placed in service.

The initial programming of the set-top box is often performed by the cable system operator after the set-top box has been purchased from a manufacturer. Because each cable network is designed and built at different times by different service providers, each cable network may have a different design and architecture and use different code objects. Additionally, each system will likely have different classes of set-top terminals which were installed at different times and have different architectures and capabilities.

Moreover, the specific services offered may vary among cable networks.

Therefore, to adapt the set-top boxes to function within the specific environment of a service provider's cable system and to provide the specific group of services currently offered by that particular service provider, each set-top box must be programmed accordingly or "initialized." Additionally, each terminal should, thereafter, be periodically re-programmed or upgraded to continue to function optimally within the evolving cable television system. Each time the programming of a set-top terminal is changed, the new code must be appropriate to the architecture and capabilities of that terminal.

The process of programming or reprogramming a set-top terminal according to the present invention will now be explained. In order for a set-top terminal to be initialized, i.e., accept and utilize the initial programming it receives, it must have some base programming that instructs it how to accept and use that initial programming. This base programming within the context of the present invention is called the boot code. As described above, the boot code is computer code resident in the permanent memory of the set-top terminal that is loaded, preferably into read-only memory, at the factory and cannot be changed once a terminal has been deployed.

Figure 1:
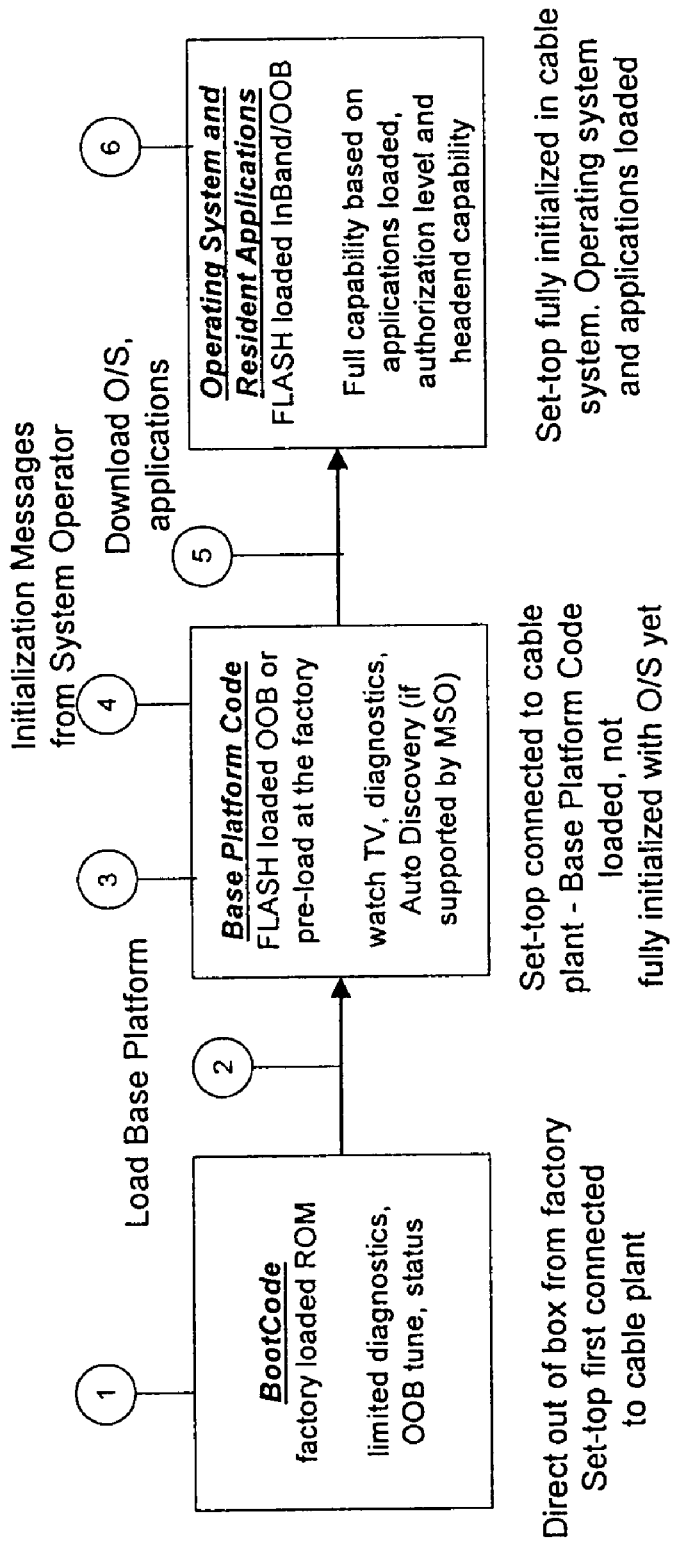
FIG. 1 is a block diagram illustrating the three different stages at which different programming packages have control of the set-top terminal during the initialization process of the present invention.

As shown in FIG. 1, there are three general tiers or classifications of programming that run on or have control of the set-top terminal during different stages in the initialization and operation of the terminal according to the present invention. Referring to FIG. 1, the first classification of code is the boot code (1). While running the boot code (1), the set-top terminal cannot provide any services to the subscriber. The function (2) of the boot code (1) is to search the data transport stream received from the headend facility to locate, acquire and begin execution of the base platform code (3) which is the next tier or classification of programming.

The boot code (1) is designed to authenticate the base platform code after the base platform code is downloaded. The boot code (1) will preferably re-authenticate the base platform code every time it launches the base platform object (3). When the base platform code (3) is executing, the execution of the boot code (1) is terminated and control of the set-top terminal passes to the base platform code (3).

The base platform code (3) may be factory loaded. However, under the principles of the present invention, the base platform code (3) is preferably transmitted to the set-top terminal from the cable headend during the initialization of the terminal. This allows the operator of the cable system to customize the base platform code (3) for optimal operation on the specific cable system where the set-top terminal is deployed. Preferably, the base platform code (3) is transmitted over the cable plant on an out-of-band (OOB) transport stream. However, it is within the scope of the present invention for the base platform code (3) to be transmitted on an in-band control channel.

The base platform code (3) has two functions. The first function of the base platform code (3) are to provide the basic capability of allowing a subscriber to watch television using the signal from the cable television system. The second function is to control the download (5) of the next classification of code objects, i.e., the target operating system (O/S) and resident applications (6). The base platform code (3), while allowing subscribers to watch television, does not generally support any additional functions of the set-top terminal. However, the base platform code (3) can acquire, authenticate, authorize and execute objects of the third and final classification of programming (e.g., the O/S) (5).

The third classification of programming, the operating system and resident applications (6) provide the additional set-top terminal functions available from the cable system. The operating system (O/S) is typically code from a third party (such as Microsoft's WinCE™) that provides access, with the resident applications, to all authorized set-top terminal capabilities. The operating system typically uses an additional embedded code module provided by the manufacturer of the set-top terminal which interfaces the operating system with the particular hardware of that set-top terminal to enable the operating system to function with that specific set-top terminal.

Resident applications are computer programs that run on the set-top terminal under the operating system. The resident applications work with the operating system to provide the capabilities of the set-top terminal that are in addition to watching television. The native suite is a specified group of software applications, including the operating system and perhaps various resident applications, that provide the intended functions of the set-top terminal. Specific elements of the native suite are determined by the system operator.

As indicated in FIGS. 1 and 3, the boot code (1,302) is preferably factory-loaded in the read-only memory (ROM) of the set-top terminal and is executed as soon as AC power is provided to the set-top terminal. Alternatively, the boot code may be executed in response to a reset signal (4) received, for example, from the headend, i.e., the system operator. This allows the system operator to re-initialize the set-top terminal whenever desired.

The reset signal (4) is preferably received by the base-platform code (3) which then terminates execution of the operating system and resident applications (6), if running, and begins execution of the boot code (1). Alternatively, the reset signal (4) may cause the base platform code (3) to terminate and reload the native suite (6) rather than execute the boot code (1).

As described above, whenever executed, the boot code (1) acquires and loads the base platform code (2). The base platform code may be provided to the set-top terminal over the cable network from the headend or, alternatively, may be factory-loaded along with the boot code. The boot code (1) will either download the base platform code (3), for example, over an out-of-band channel from the headend or, if the base platform code was factory-loaded, identify the base platform code (3) in memory. The boot code (1) authenticates the base platform code (3) from whatever source it is obtained and then executes the base platform code (3).

The base platform code (3) then acquires the operating system and, preferably, the other objects of the native suite (6). The operating system and the other objects are downloaded from the headend over the cable network. The base platform code (3) will acquire the operating system and other objects when first executed or, while running, in response to an initialization message (4) from the system operator. The initialization message (4) maybe provided over the cable network. The operating system and resident applications (6) are then executed when the native suite is acquired, authorized and authenticated.

Figure 2:
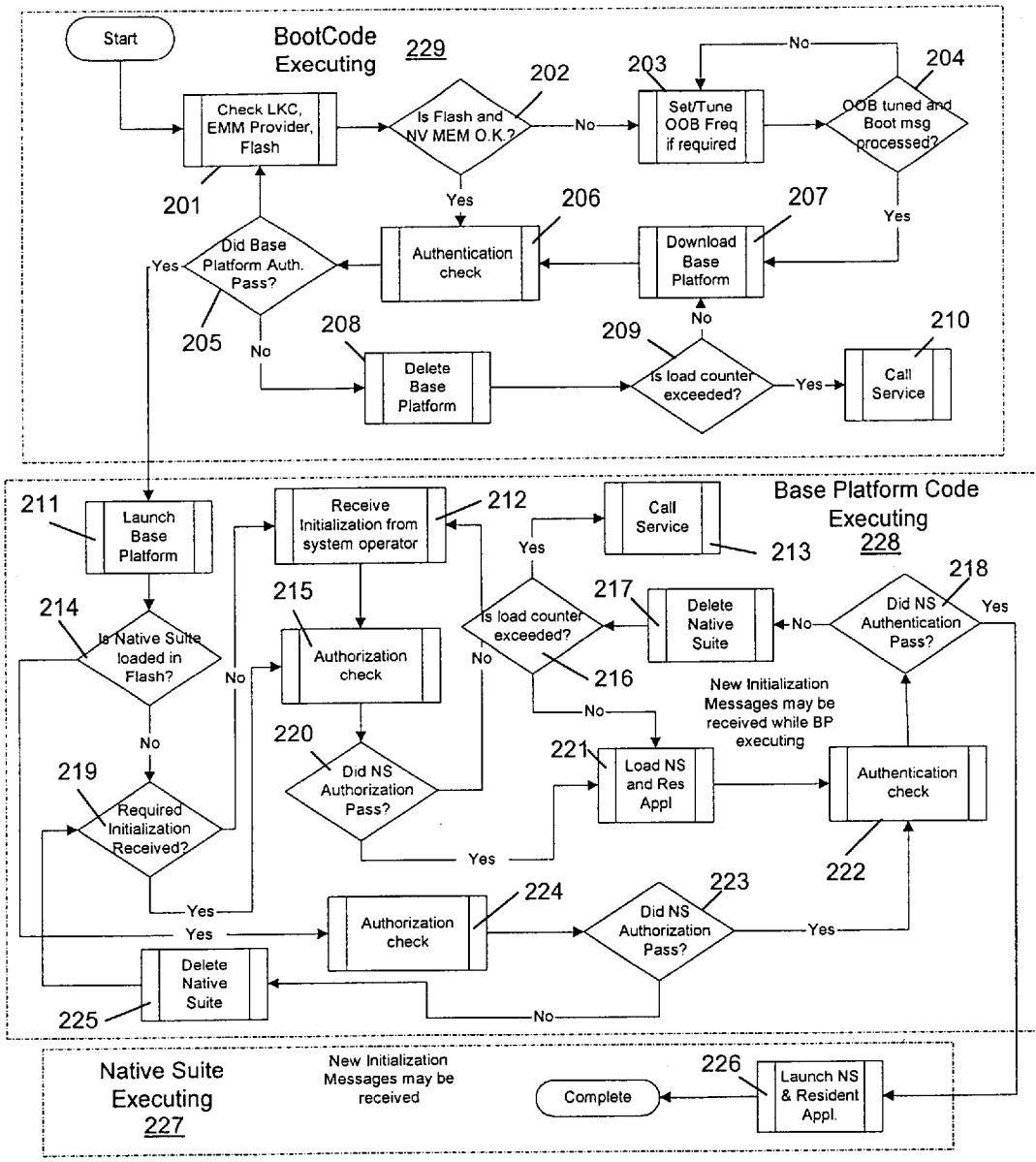
FIG. 2 is a flow chart illustrating the steps of the initialization process for a set-top terminal according to the present invention.

FIG. 2 is a flowchart providing a more detailed explanation of the initialization sequence according to the present invention. As shown in FIG. 2, when the set-top terminal is first powered, or an appropriate reset signal has been received, the boot code is executed (229). The boot code must first determine whether the set-top box has or must acquire the base platform code. To determine this, the boot code first checks the flash memory for the base platform code, the last known carrier (LKC) frequency of the control channel from the headend, and an Entitlement Management Message Provider Identification ("EMM Provider ID") (201, 202).

If any of three following conditions are discovered, the boot code will conclude that it must acquire the base platform code and will hunt for the out-of-band channel or the in-band channel from which the base platform code can be obtained. The boot code seeks to acquire the base platform code if (1) the base platform code, last known carrier and EMM Provider ID are not stored in the Flash memory, (2) the base platform code in the Flash memory fails an authentication check or (3) non-volatile memory indicates that hunting for the control channel (likely an out-of-band channel) is required.

If the Flash check determines that a base platform code object exists, the boot code proceeds to execute that base platform object after appropriate authorization and authentication as described below. If both the base platform and the O/S are loaded in Flash, the boot code authorizes and authenticates the base platform and then launches the base platform and passes control of the set-top terminal thereto. The base platform object, in turn, authorizes and authenticates (A&A) the O/S. The authenticated O/S is then run and control passes to the O/S.

If the base platform code is not loaded in Flash memory, the boot code loads the base platform off of the out-of-band transport stream (203, 204, 207). However, before it is written to Flash memory, a successful authentication is required (206, 205). When the authenticated base platform code is executed, the boot code passes control to the base platform (211,228). If the base platform code fails the authentication check (205), the failed base platform code is deleted (208) and a counter is incremented (209) that tracks the number of attempts to acquire and authenticate a base platform code. If the counter is below a predetermined acceptable number of attempts, the base platform code is again downloaded (207). Alternatively, if the acceptable number of attempts to download the base platform code is exceeded, the set-top terminal may signal the headend for a service call (210).

Under the principles of the present invention, the boot code locates the base platform object using a boot code message or "bootcode_control_message" that is sent periodically on the out-of-band transport stream (204). Use of the bootcode_control_message will now be described in detail.

When the boot code determines the need to download the base platform object, it first hunts for the control channel. A table of possible carrier frequencies at which the control channel or channels are being broadcast is included in the boot code. These frequencies may be both in-band and out-of-band. The boot code will cause the set-top terminal to tune each of these frequencies in turn until the control channel is located and a carrier lock is obtained. If no control channel is received at a particular frequency for a predetermined period of time, the set-top terminal will tune the next frequency in the table.

The control channel is a stream of data packets that can be received and used by the set-top terminal. In order to broadcast a number of different objects simultaneously, the headend will divide objects to be transmitted over the control channel into packets. The packets of the various objects being transmitted can then be interspersed or time-multiplexed together so that several objects are all transmitted essentially simultaneously. The packets for each particular object will have a common packet identifier or "PID." Thus, a set-top terminal can identify the packets for the object it is working to acquire. By acquiring all the packets with a particular PID, the complete object can then be reassembled by the set-top terminal from the set of packets with that particular PID.

According to the present invention, a set-top terminal can start anywhere in the progression to acquire an object and wrap around until all the necessary packets are downloaded. For example, the set-top terminal may load the first packet it receives with a PID X. That packet may be packet 50 of 100 marked by PID X. The terminal then continues to collect packets 51 to 100 with PID X, then 1 to 49. With all 100 packets obtained, the terminal can reassemble the packetized object.

Of particular concern to the present invention it the potential need to broadcast a number of objects simultaneously to accommodate different types or classes of set-top terminals in the population. Each class of set-top terminals may need a different version of, for example, the base platform code, the O/S or a resident application. Therefore, when the boot code is going to initialize the set-top terminal and must acquire the base platform code, the boot code must determine where to acquire the base platform appropriate to the set-top terminal on which it is running.

Figure 4:
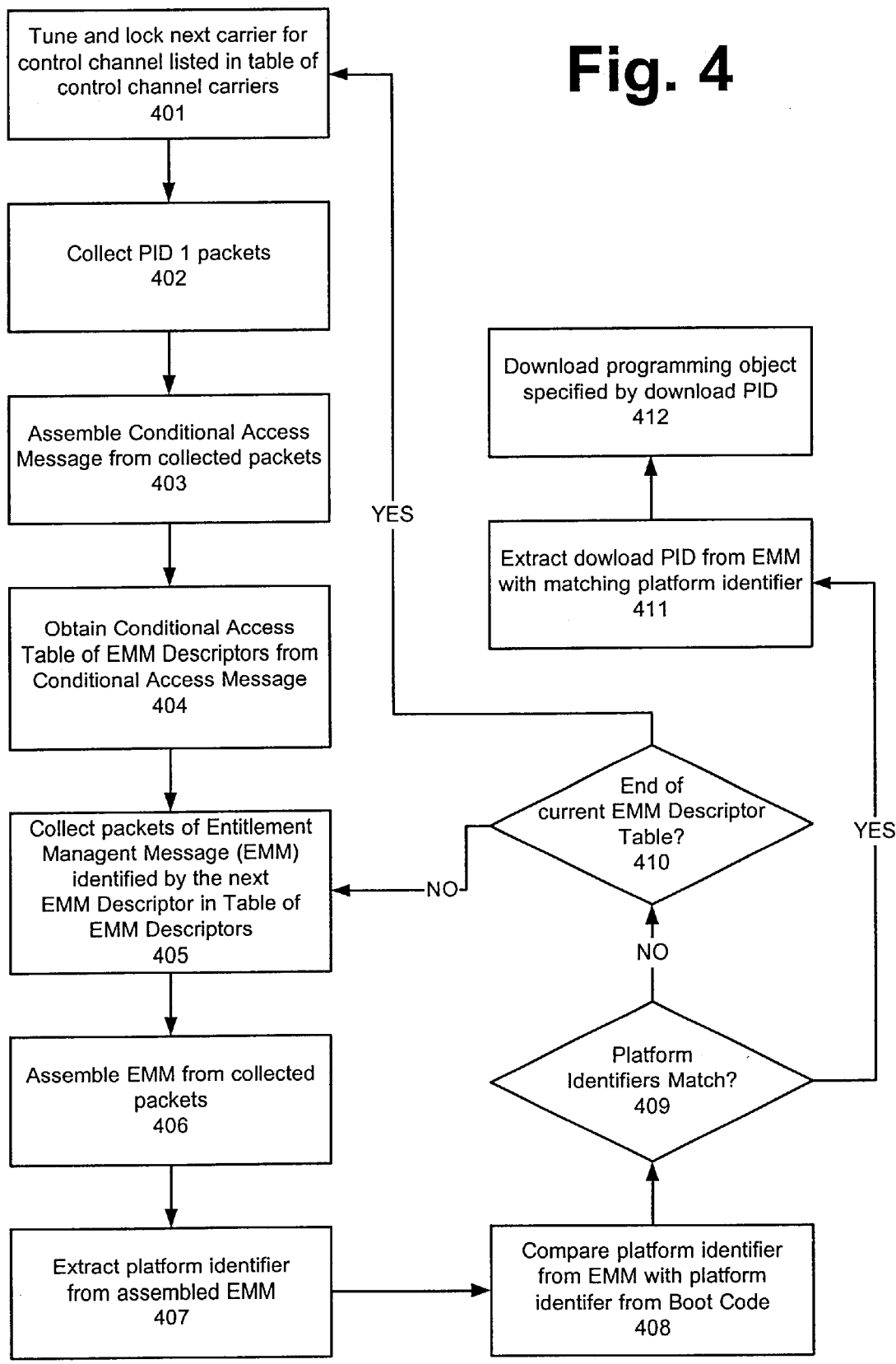
FIG. 4 is a flow chart illustrated the method of the present invention for identifying code objects to be downloaded that are appropriate to the architecture and capabilities of the downloading set-top terminal.

The process for identifying the correct object to download will now be described in detail with reference to FIGS. 3 and 4. As shown in FIG. 3, the processor (321) of the set-top terminal (300) controls a tuner (323) to tune a control channel over which data and programming are being broadcast by the headend to the population of set-top terminals.

The set-top box (300) will have a table of carrier frequencies at which the headend may be broadcasting a control channel of data and programming. As shown in FIG. 4, the method of the present invention may begin with the set-top terminal tuning the first control channel listed in that table (401). Once the carrier lock is achieved and the control channel is being received, the boot code will begin collecting packets from the transport stream on the control channel that are identified with PID 1 (402). PID 1 is dedicated to the conditional access message in the MPEG standard. The packets of PID 1 will provide the boot code running on the set-top terminal with a Conditional Access Table (CAT) of EMM Provider IDs each of which identifies a PID for a set of packets on the transport stream that constitute an EMM stream (Entitlement Management Message) (403, 404).

The boot code will begin with the first EMM Provider ID and begin loading packets from the transport stream that are marked with the EMM PID given by the first EMM Provider ID (405). The EMM PID packets being acquired will contain a boot code message of the present invention which, in turn, includes a platform identifier. Thus, the Entitlement Management Message will be extracted from the EMM PID packets acquired (406) and the platform identifier from the EMM will be extracted (407).

As shown in FIG. 3, the boot code (302) which is factory-installed in the set-top terminal will also include a platform identifier (320) that is specific to the type, architecture and capabilities of terminal (300) in which the boot code is resident. When running, the boot code will attempt to match the platform identifier provided at the factory with the platform identifier from the boot code message of the EMM PID packets (408, 409).

If no match is found, the boot code will select the next EMM Provider ID in the CAT and check the packets of the EMM PID identified by that EMM Provider ID for a boot code message with a matching platform identifier (410, 405). This continues until the matching platform identifier is found. It may be possible to search multiple EMM PID's simultaneously to reduce the EMM validation time and the time required to find the matching boot code message.

If all the EMM Provider IDs in the CAT of PID 1 are checked and no match is found for the platform identifier (410), the boot code will look for another control channel on another carrier frequency by returning to the table of carrier frequencies (401). When another frequency with a control channel is identified and locked, the boot code will extract PID 1 and repeat the process outlined above. This continues until a boot code message with a platform identifier matching the platform identifier of the boot code is found.

When the boot code finds a boot code message with a matching platform identifier, the boot code will extract a download PID (DL PID) specified by the EMM with the matching platform identifier (411). The download PID (DL PID) is the identifier for the packets that carry the code object, e.g., the base platform code object, that is appropriate for the type of set-top terminal (300) with the platform identifier (320). The boot code can then download the base platform code or other code object by acquiring the packets with the DL PID and reassembling the data in those packets into the base platform code.

As will be understood by those in the art, the platform identifier (320) of the present invention can be used to check any type of code object for is compatibility with the terminal in which the identifier (320) is resident. The invention is not limited to the use of the identifier (320) by the boot code (302) to locate and identify an appropriate base platform code. The platform identifier (320) of the present invention can be used in the same manner described above, for example, by the base platform code to identify and acquire an operating system object designed for the downloading set-top terminal. The platform identifier (320) can also be used to identify other elements of the native suite, i.e., resident applications, that are appropriate for the downloading set-top terminal.

Additionally, the platform identifier (320) of the present invention need not necessarily be incorporated into the boot code (302). Rather, the platform identifier (320) can be stored anywhere within the set-top terminal (300) where it can be accessed by the executing programs that require it to identify appropriate code objects for download.

As shown in FIG. 2, once the base platform code has been downloaded or identified as already resident in Flash memory, an authentication check (206) is performed to verify that the base platform code has been accurately and completely received and has not been altered by an unauthorized party. If the base platform fails the authentication check, it is deleted (208). A load counter may then be checked to determine the number of times the set-top terminal has attempted to acquire a valid base platform code (209). If the counter exceeds a predetermined limit, the set-top terminal may signal the headend for a service call or may indicate the need to request a service call to the subscriber (210). If the load counter is not exceeded, the boot code will revert to the process described above and attempt again to download the base platform code (207).

Alternatively, if the base platform code is authenticated, it is then launched (211). The base platform code will then determine if the native suite, including the O/S, is loaded in the Flash memory (214). If it is not, the base platform code. will seek to download the native suite.

With the base platform code running, the system operator may provide the set-top terminal with a set of "initialization messages" that provide, for example, channel maps, tables and EMM information (219, 212). These messages should be provided before the native suite is loaded. The initialization messages may instruct the set-top terminal where to acquire the native suite.

After the native suite has been downloaded, or is found already existing in Flash memory, an authorization check is performed on the native suite (215, 220, 224, 223). The download of the native suite will include an Object Conditional Access Message (OCAM) that is recorded by the set-top terminal. The authentication signature and authorization code for the native suite object are provided in the OCAM and used to authorize and authenticate the native suite in the manner described below.

If the authorization check is not successful, the native suite code will be deleted (225, 217) and the base platform code will again attempt to acquire the native suite (221). If the authorization check is successful, the native suite and any resident applications associated with it, are loaded and an authentication check is performed (222). As before, if the authentication check fails, the downloaded code will be deleted (217) and a load counter will be checked (216) to see if another attempt to download the code should be made or a service call signaled (213).

Alternatively, if the authentication check (222, 218) is successful, the native suite and any associated resident applications will be executed beginning with the O/S (226, 227). The base platform code performs the authorization and authentication on the O/S code. If the O/S passes the authorization and authentication. checks, the O/S is executed and control is transferred to the O/S. The BIOS (Basic Input/Output Software) may perform the authorization and authentication of the remainder of the native suite (215, 224, 222).

In summary, various portions of the boot process include an object authorization and authentication (A&A) process for newly acquired or located objects. The authorization check of the native suite is done within the base platform. The authorization of the base platform is, in turn performed by the boot code, which can only authenticate a base platform object. When running, the O/S of the native suite performs the authentication and authorization of subsequently loaded objects. These checks are required so that, given an interruption in power, etc., the authorization status of the terminal can be verified. If, at any point an authorization or authentication check fails, the object being checked is disabled.

Authentication is performed as follows. When a code object is broadcast over the cable network, it is associated with an authorization code and an authentication signature. For the base platform object, the authorization code is preferably given in an object_id field of the boot code message. The authentication signature is preferably given in an object_description field of the boot code message. For other objects, such as the O/S and the native suite, the authorization code and authentication signature are provided in an OCAM downloaded with the object.

The authentication signature is computed mathematically using a specific algorithm with the code object itself as the input for the algorithm. The signature is then re-computed by the set-top terminal using the same algorithm and the downloaded code as input. If the signature computed by the set-top terminal matches the one transmitted with the code, the code can be implemented with confidence that its has been transmitted properly, without inadvertent or malicious alteration.

The present invention provides for two basic ways to upgrade the basic platform in a population of set-top terminals once those terminals have been placed in full service. These two methods of upgrade are (1) a universal upgrade of the entire population (i.e., the entire population tuned to a particular control stream) and (2) a targeted upgrade of a subset or subsets of the population. Both methods may make use of the boot code to perform the upgrade.

A universal upgrade is accomplished by broadcasting an order from the headend for all set-top terminals on the control stream to delete their existing base platform object. The boot code then begins executing, assumes control, and performs the initialization procedure outlined above, including replacing the deleted base platform with a base platform downloaded over the cable network.

A targeted upgrade applies to a single terminal or a small group of terminals on a given control channel. Each terminal has a specific single-cast address and can, therefore, be addressed by the headend and instructed to delete the existing base platform code and re-initialize with upgrade code. Alternatively, each terminal has one or more multi-cast addresses that are shared by other terminals in the population. Four such multi-cast addresses for each terminal are preferred. With a multi-cast address, the headend can signal a code purge and re-initialization for a specific class of terminals that share that particular multi-cast address.

In a targeted upgrade, the base platform, using standard download messages, sets up download parameters in a start-up database in non-volatile memory (See FIG. 3) and allows the boot code to take control. The boot code then uses the parameters to acquire the upgraded base platform code, replacing the original base platform code. This is done while the older version of the base platform code is still spinning at a location indicated by the boot message.

In addition to the examples given above, an upgrade need not disturb the base platform code. Rather, the upgrade or reset signal, whether universal or targeted, may instruct the set-top terminal(s) to terminate and delete only the operating system (O/S), the entire native suite, or one or more particular resident applications. Control then returns to the base platform code which will acquire and authenticate a new O/S, entire native suite, or portions of the native suite as necessary. In this way, the native suite (or just the O/S) can be upgraded without requiring the base platform code to be reacquired as well.

FIG. 3 illustrates four memory units of a set-top terminal (300) according to the present invention. A read-only memory unit (ROM) (301) contains the boot code (302). A flash memory unit (303) contains the base platform code (304) and the O/S object (306). Aside from these objects, additional flash memory is available (305). Two stack pointers (307, 308) designate absolute locations in the Flash memory (303) for the base platform code (304, 308) and the O/S (306, 307). It is important that these two objects are always located at the same location in Flash (303).

A non-volatile memory unit (310) preferably has both a managed and a non-managed segment. The base platform code (304) may store parameters and other data in the non-managed portion of the non-volatile memory unit (310). Finally, a random access memory unit (RAM) (309) is provided.

Downloaded objects such as the base platform code, the O/S, etc. may be stored in the RAM (309) until authenticated. Once authorization and authentication are successfully completed, the objects may be transferred from the RAM (309) to the Flash memory unit (303) for long-term storage.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated.

What is claimed is:

1. A method of identifying a code object for download by a set-top terminal from a data transport stream broadcast to the set-top terminal over a cable television system where the object identified is appropriate to the architecture and capabilities of the set-top terminal, the method comprising matching a platform identifier stored in said set-top terminal with a second platform identifier in a download locator message that specifies where in said data transport stream a particular code object can be acquired, wherein said platform identifier stored in said set-top terminal is specific to said architecture and capabilities of said set-top terminal;
wherein said download locator message is added as part of an entitlement management message.

2. The method of claim 1, further comprising tuning said data transport stream with said set-top terminal based on a table of control channels carrying data transport streams.

3. The method of claim 1, further comprising collecting PID 1 packets from said data transport stream and extracting therefrom a table specifying packet identifiers for a plurality of download locator messages being transmitted on said data transport stream.

4. The method of claim 3, further comprising successively acquiring said plurality of download locator messages according to said table and extracting platform identifiers therefrom until a download locator message is found bearing a platform identifier that matches said platform identifier stored in said set-top terminal.

5. The method of claim 4, further comprising obtaining locator data from said download locator message having a platform identifier that matches said platform identifier stored in said set-top terminal, wherein said locator data specifies where in said data transport stream a particular code object can be acquired.

6. The method of claim 5, further comprising downloading to said set-top terminal said particular code object specified by said locator data from said download locator message having a platform identifier that matches said platform identifier stored in said set-top terminal.

7. The method of claim 1, wherein said code object is a base platform code object.

8. The method of claim 1, wherein said code object is an operating system code object.

9. The method of claim 1, wherein said code object is a resident application code object.

10. A system for of identifying a code object for download by a set-top terminal from a data transport stream broadcast to the set-top terminal over a cable television system where the object identified is appropriate to the architecture and capabilities of the set-top terminal, the system comprising:
means for obtaining a first platform identifier in a download locator message that specifies where in said data transport stream a particular code object can be acquired; and means for matching said first platform identifier with a second platform identifier stored in said set-top terminal, wherein said platform identifier is specific to said architecture and capabilities of said set-top terminal;

wherein said download locator message is added as part of an entitlement management message.

11. The system of claim 10, further comprising means for tuning said data transport stream with said set-top terminal based on a table of control channels carrying data transport streams.

12. The system of claim 10, further comprising:

means for collecting PID 1 packets from said data transport stream; and means for extracting therefrom a table specifying packet identifiers for a plurality of download locator messages being transmitted on said data transport stream.

13. The system of claim 12, further comprising means for successively acquiring said plurality of download locator messages according to said table and extracting platform identifiers therefrom until a download locator message is found bearing a first platform identifier that matches said second platform identifier stored in said set-top terminal.

14. The system of claim 13, further comprising means for obtaining locator data from said download locator message having said first platform identifier that matches said second platform identifier stored in said set-top terminal, wherein said locator data specifies where in said data transport stream a particular code object can be acquired.

15. The system of claim 14, further comprising means for downloading to said set-top terminal said particular code object specified by said locator data from said download locator message having said first platform identifier that matches said second platform identifier stored in said set-top terminal.

16. The system of claim 10, wherein said code object is a base platform code object.

17. The system of claim 10, wherein said code object is an operating system code object.

18. The system of claim 10, wherein said code object is a resident application code object.

19. A method of initializing a set-top terminal, said method comprising:

executing a boot code object with said set-top terminal; and with said boot code object, acquiring and launching a base platform code object on said set-top terminal by matching a platform identifier stored in said set-top terminal with a second platform identifier in a download locator message that specifies where in a data transport stream said base platform code object can be acquired, wherein said platform identifier stored in said set-top terminal is specific to said architecture and capabilities of said set-top terminal and wherein said download locator message is added as part of an entitlement management message;

wherein said base platform code object, when executing, provides said set-top terminal with an ability to receive, tune and output television programming from a cable television system.

20. The method of claim 19, wherein said acquiring said base platform code object comprises retrieving said base platform code object from a memory of said set-top terminal.

21. The method of claim 19, wherein said acquiring said base platform code object further comprises downloading said base platform code object from a headend.

22. The method of claim 19, wherein said acquiring and launching said base platform code object further comprises authenticating said base platform code object prior to launching said base platform code object.

23. The method of claim 22, further comprising, if said base platform code object fails said authenticating of said base platform code object, deleting said base platform code object; re-acquiring said base platform code object; and authenticating said re-acquired base platform object.

24. The method of claim 23, further comprising counting a number of failed attempts to authenticate a base platform code object.

25. The method of claim 24, further comprising signaling for a service call when said number of failed attempts to authenticate a base platform code object reaches a pre-determined limit.

26. The method of claim 19, wherein said acquiring said base platform code object further comprises checking memory of said set-top terminal for a base platform code object, a last known carrier frequency of a control channel and an Entitlement Management Message Provider Identification.

27. The method of claim 26, further comprising downloading said base platform code object to said set-top terminal if said base platform code object, last known carrier frequency of a control channel and Entitlement Management Message Provider Identification are not found in said memory of said set-top terminal.

28. The method of claim 19, further comprising, with said base platform code object executing on said set-top terminal, acquiring and launching an operating system on said set-top terminal.

29. The method of claim 28, wherein said acquiring said operating system comprises retrieving said operating system from a memory of said set-top terminal.

30. The method of claim 28, wherein said acquiring said operating system further comprises downloading said operating system from a headend.

31. The method of claim 28, wherein said acquiring and launching said operating system further comprises authenticating and authorizing said operating system prior to launching said operating system.

32. The method of claim 31, further comprising, if said operating system fails said authenticating and authorizing, deleting said operating system; re-acquiring said operating system; and authenticating and authorizing said re-acquired operating system.

33. The method of claim 32, further comprising counting a number of failed attempts to authenticate and authorize an operating system.

34. The method of claim 33, further comprising signaling for a service call when said number of failed attempts reaches a pre-determined limit.

* * * * *